United States Patent
Harada

(10) Patent No.: US 6,338,375 B1
(45) Date of Patent: Jan. 15, 2002

(54) TOOL FOR TIGHTENING AND MELT-ADHERING A STRAP

(75) Inventor: Hiroshi Harada, Yamaguchi-Ken (JP)

(73) Assignee: Kohan Kogyo Co., Ltd., Kudamatsu (JP)

(*) Notice: Subject to any disclaimer, the term of this patent is extended or adjusted under 35 U.S.C. 154(b) by 0 days.

(21) Appl. No.: 09/268,693

(22) Filed: Mar. 16, 1999

(30) Foreign Application Priority Data

Dec. 11, 1998 (JP) ............................................. 10-375182

(51) Int. Cl.⁷ ........................... B32B 31/00; B32B 35/00
(52) U.S. Cl. ..................... 156/391; 156/494; 156/502; 156/580
(58) Field of Search ............................. 156/73.5, 73.6, 156/358, 391, 502, 494, 580

(56) References Cited

U.S. PATENT DOCUMENTS

| | | |
|---|---|---|
| 3,654,033 A | 4/1972 | Angarola et al. |
| 3,988,193 A * | 10/1976 | Arens ........................ 156/446 |
| 4,096,019 A * | 6/1978 | Lehmann .................... 156/494 |
| 5,169,480 A | 12/1992 | Toppel et al. |
| 5,380,393 A * | 1/1995 | Drabarek et al. ............ 156/358 |
| 5,476,569 A * | 12/1995 | Harada ....................... 156/502 |
| 5,632,851 A * | 5/1997 | Young ........................ 156/494 |
| 5,941,114 A * | 8/1999 | Kusaba ........................ 72/177 |
| 5,942,061 A * | 8/1999 | Figiel et al. ................ 156/73.5 |

FOREIGN PATENT DOCUMENTS

| | | |
|---|---|---|
| JP | 49-45360 | 12/1974 |
| JP | 49-46880 | 12/1974 |
| JP | 4-279411 | 10/1992 |
| JP | 7-29644 | 4/1995 |

* cited by examiner

Primary Examiner—Richard Crispino
Assistant Examiner—Sue A. Purvis
(74) Attorney, Agent, or Firm—Finnegan, Henderson, Farabow, Garrett & Dunner, L.L.P.

(57) ABSTRACT

A tool for tightening and melt-adhering a strap, which is light in weight, can be operated by one hand, performs a series of operations, i.e., tightening, pressurizing and frictionally melt-adhering the strap by utilizing power (fluid pressure) instead of manual operation, and which enables the time for frictional melt-adhesion to be adjusted over a wide range and highly precisely with ease, enabling the worker to continue the operation maintaining high efficiency with less fatigue. The tool for tightening and melt-adhering the strap comprises a means for pressing a tightening roller which includes a reversible motor, a means for pressing a vibrator for friction, and a timing mechanism capable of adjusting the time for driving the vibrator over a wide range and finely, which are compactly arranged as a unitary structure.

7 Claims, 16 Drawing Sheets

TOOL FOR TIGHTENING AND MELT-ADHERING A STRAP

BACKGROUND OF THE INVENTION

1. Field of the Invention

The present invention relates to a tool for tightening and melt-adhering a strap. More particularly, the invention relates to a tool for tightening and melt-adhering a strap, which is light in weight, markedly improves the operation efficiency as a result of omitting manual operation, and is equipped with a timing mechanism which can be easily adjusted to determine an expected friction time for establishing a suitable melt-adhering condition for the strap.

2. Prior Art

There have heretofore been proposed a variety kinds of tools with which a strap made of a thermoplastic material such as polypropylene (PP), polyethylene terephthalate (PET) or polyamide resin is wound round a package thereby to form a loose strap which is then tightened by a knurled roller to form a tight strap, and the overlapped portion of the strap is rubbed under the application of a pressure, and these tools have already been placed in the market. Among them, the newest model has been disclosed in, for example, Japanese Examined Patent Publication (Kokoku) No. 29644/1995 (U.S. Pat. No. 5,169,480) filed by Signode Corporation. In order to reduce the weight, this tool has only one hydraulic pressure motor which is used for tightening a loose strap and for driving a vibrator for rubbing the overlapped portion of the strap, by mechanically changing over the hydraulic pressure motor by using a manual lever, a cam and a clutch.

According to this tool, however, the pressure of the knurled roller or the vibrator is exerted on the overlapped portion of the strap and the unnecessary part of the strap is cut by hand using the manual lever. Therefore, the tool must be operated by both hands, causing the operation efficiency to become poor, causing the worker to be tired with, and making it difficult to continue the operation for extended periods of time.

The above-mentioned Japanese Examined Patent Publication (Kokoku) No. 29644/1995 incorporates a fluid (pneumatic)-type timing mechanism for limiting the rubbing time disclosed in Japanese Examined Patent Publications (Kokoku) Nos. 45360/1969 and 46880/1974, and U.S. Pat. No. 3,654,033 previously filed by the applicant of the present application, and seems to be achieving the effects correspondingly involving, however, such problems as narrow range for controlling the friction time and difficulty in the control operation due to the structure.

SUMMARY OF THE INVENTION

In order to improve these problems, therefore, the present inventors have forwarded the study concerning a cylinder for pressurizing a tightening roller and for turning the tightening roller back and forth, and have further employed a fluid pressure motor exclusively for a vibrator and improved the timing mechanism while paying effort so will not to increase the weight, and have arrived at a tool which is very easy to handle as contemplated by the present invention.

The object of the present invention is to provide a tool for tightening and melt-adhering a strap, which is light in weight, easy to operate, causes the worker to be less tired with, and enables the operation to be continued for extended periods of time.

Another object of the present invention is to provide a tool for tightening and melt-adhering a strap, which cuts the unnecessary part of the strap after it has been tightened, and frictionally melt-adheres the overlapped portion of the strap with the application of pressure relying on the fluid pressure operation minimizing the manual operation, and further enables the tool to be easily separated from the strap after it has been tightened.

A further object of the present invention is to provide a tool for tightening and melt-adhering a strap, equipped with a timing mechanism which makes it easy to adjust the time for rubbing the overlapped portion of the strap over a wide range.

According to the present invention, there are provided:

A tool for tightening and melt-adhering a strap, with which a loose strap wound round a package is tightened by a tightening roller arranged at the overlapped portion of the strap to form a tight strap, an extra strap is cut and removed by a cutter, and a frictional force is imparted to the overlapped portion of the strap to melt-adhere the strap, wherein provision is made of a hydraulic pressure cylinder for pressurizing the tightening roller, a first fluid pressure motor for turning said roller forward and reverse, a fluid pressure cylinder for pressurizing a vibrator that gives a frictional force to the overlapped portion of the strap, and a second fluid pressure motor for driving said vibrator (claim 1);

A tool for tightening and melt-adhering a strap according to claim 1, wherein provision is made of a timing mechanism capable of adjusting the time for feeding a pressurized fluid to the second fluid pressure motor (claim 2);

A tool for tightening and melt-adhering a strap according to claim 2, wherein the timing mechanism works based on a fluid pressure (claim 3);

A tool for tightening and melt-adhering a strap according to claim 3, wherein the fluid pressure timing mechanism is the one of a variable back pressure type, the one of a variable volume type, or the one of a variable back pressure/volume type based on the combination of the two (claim 4);

A tool for tightening and melt-adhering a strap according to claim 4, wherein the fluid pressure timing mechanism is the one of the variable back pressure type in which at least one of the fluid accumulation chambers branched from a main pressurized fluid circuit has a variable back pressure valve for releasing the fluid back pressure, said fluid pressure timing mechanism being further equipped with a shut-off valve which shuts off the main pressurized fluid circuit to the second fluid pressure motor relying upon a fluid pressure stored in the fluid accumulation chamber (claim 5); and A tool for tightening and melt-adhering a strap according to claim 4, wherein the fluid pressure timing mechanism is the one of the variable volume type in which at least one of the fluid accumulation chambers branched from a main pressurized fluid circuit is of the variable volume type being constituted by a piston that can be moved by a screw directly driven from the external side and a cylindrical fluid accumulation chamber, said fluid pressure timing mechanism being further equipped with a shut-off valve which shuts off the main pressurized fluid circuit to the second fluid pressure motor relying upon a fluid pressure stored in the fluid accumulation chamber (claim 6).

DETAILED DESCRIPTION OF THE INVENTION

The invention will now be described in detail by way of embodiments.

Figure 1:
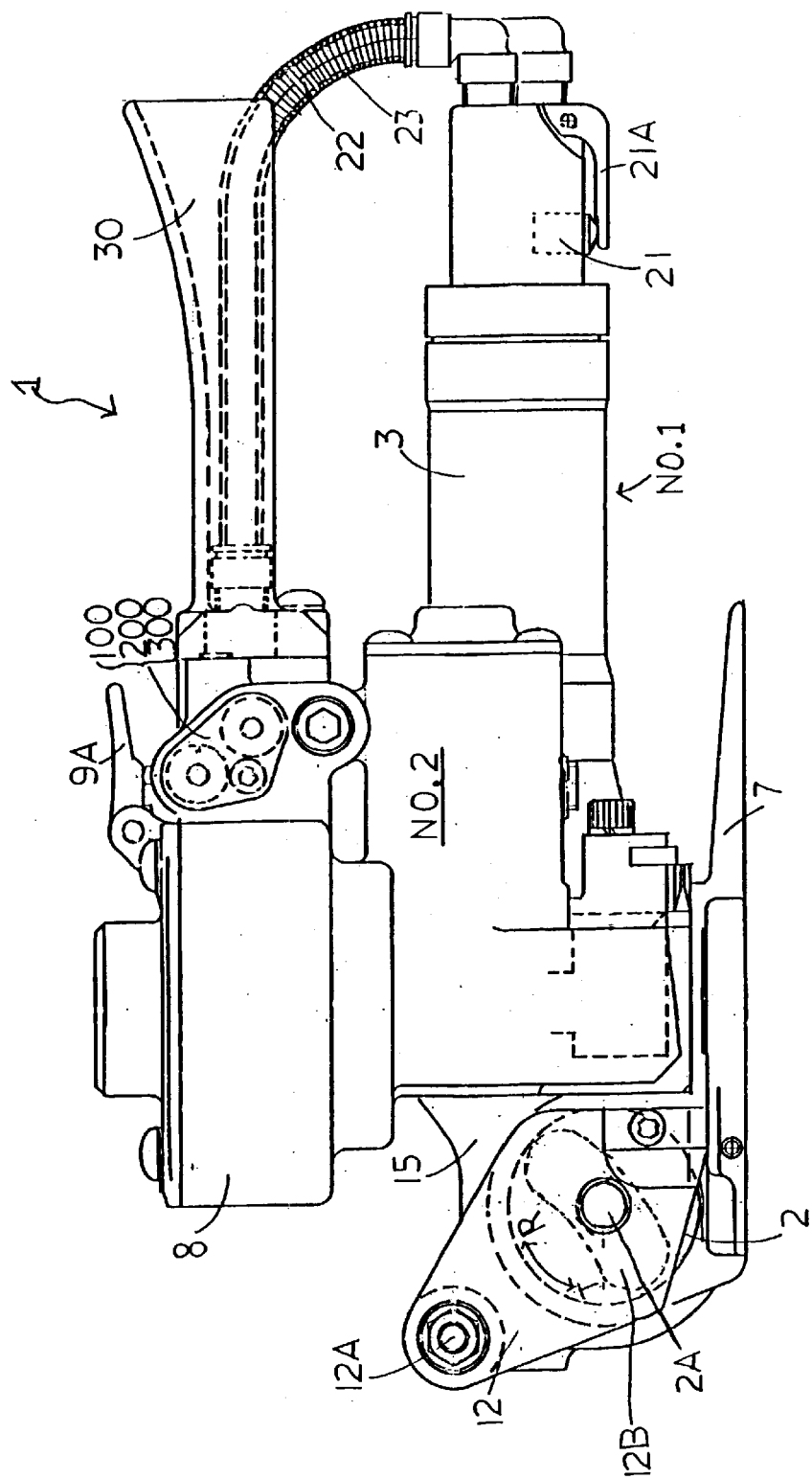
FIG. 1 is a view illustrating the right side of an embodiment.
Figure 2:
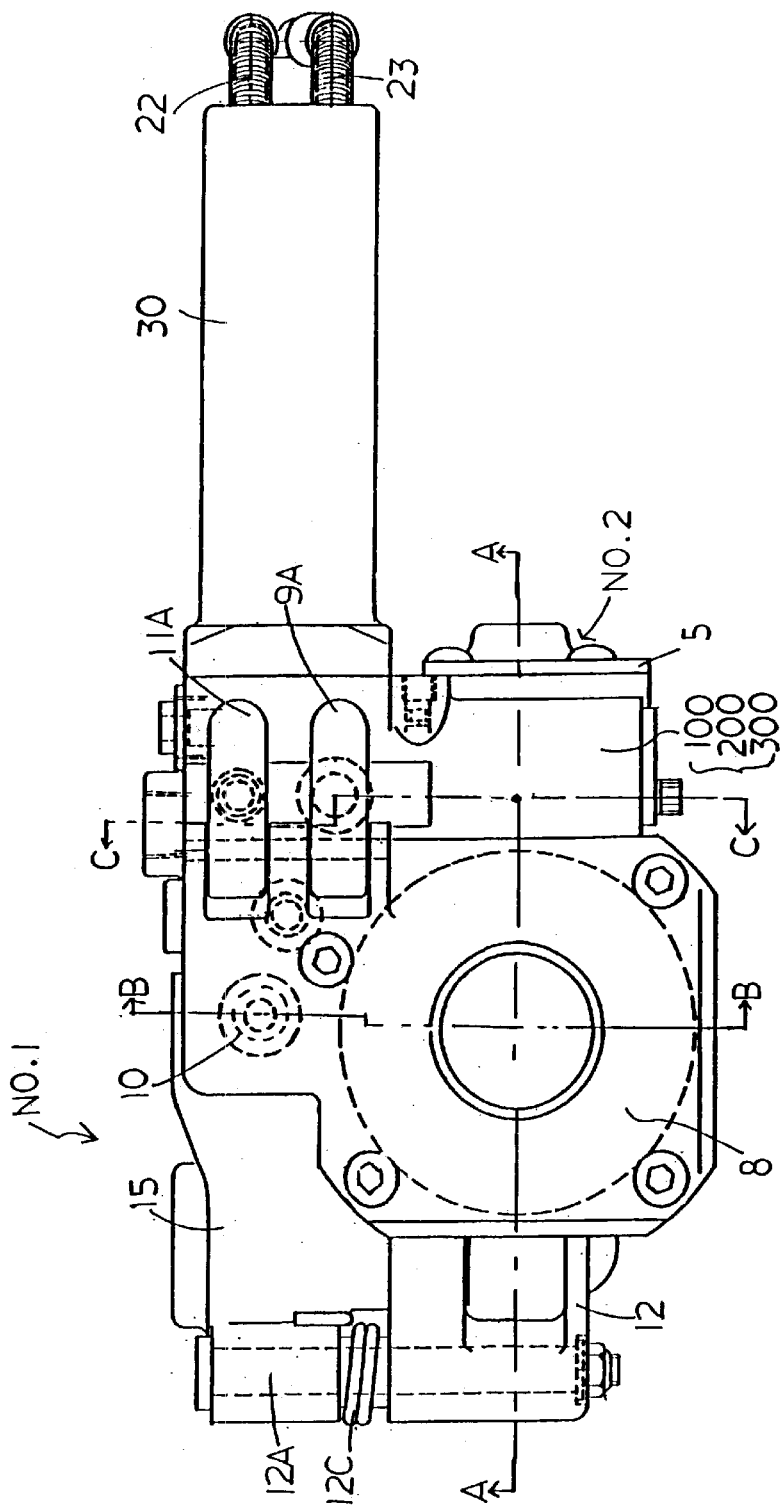
FIG. 2 is a plan view illustrating the embodiment.
Figure 3:
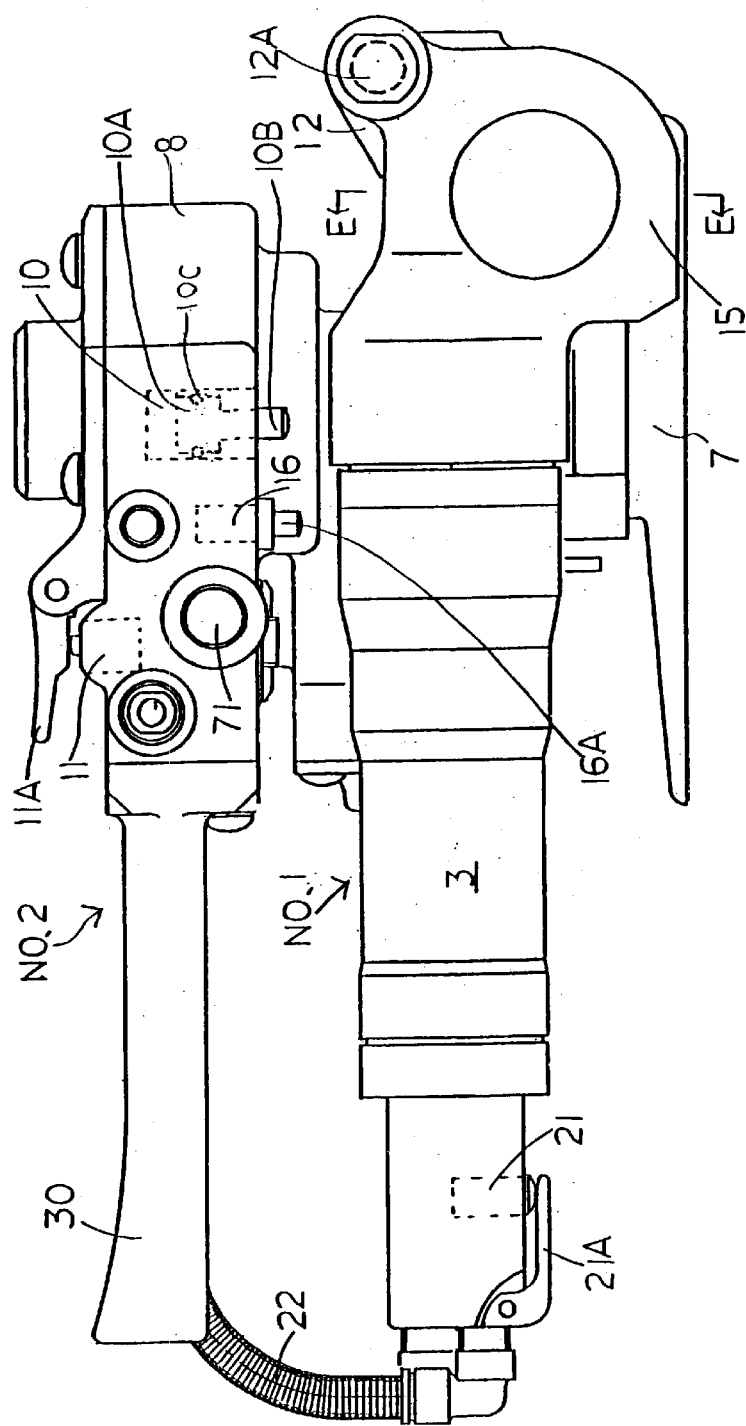
FIG. 3 is a view illustrating the left side of the embodiment.
Figure 4:
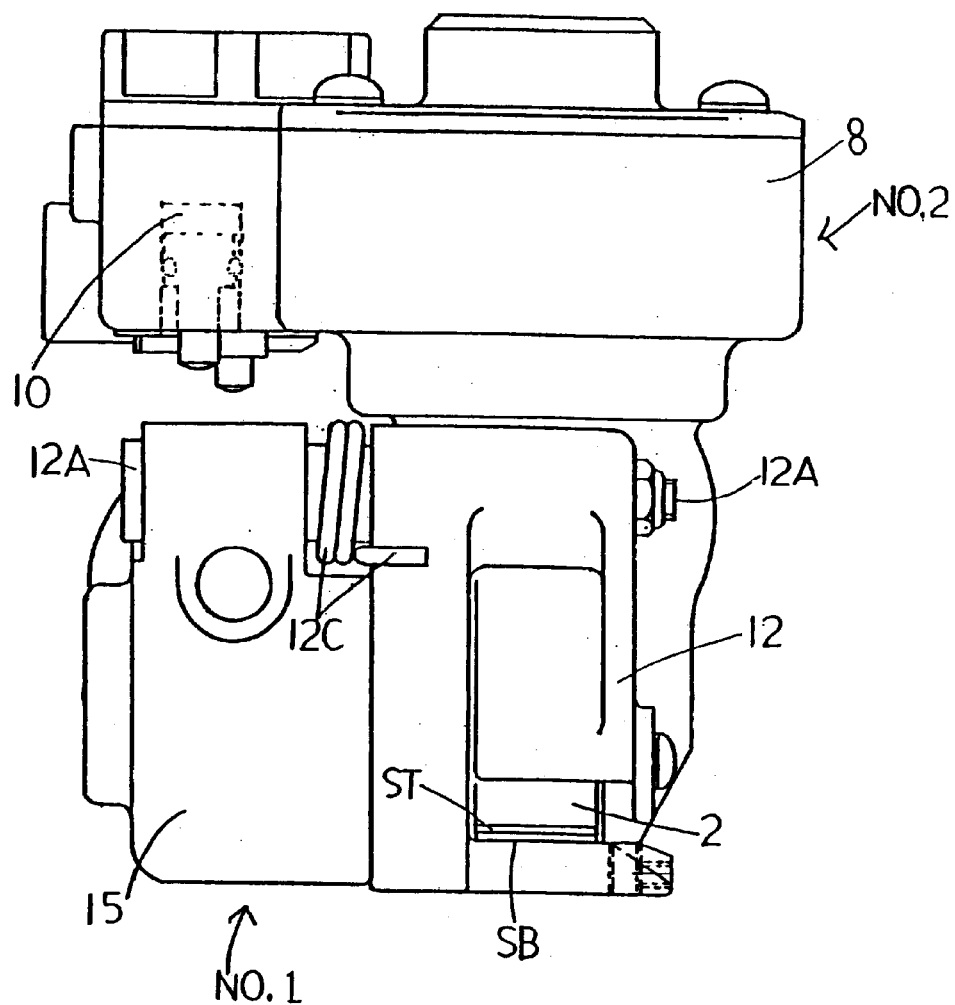
FIG. 4 is a front view illustrating the embodiment.
Figure 5:
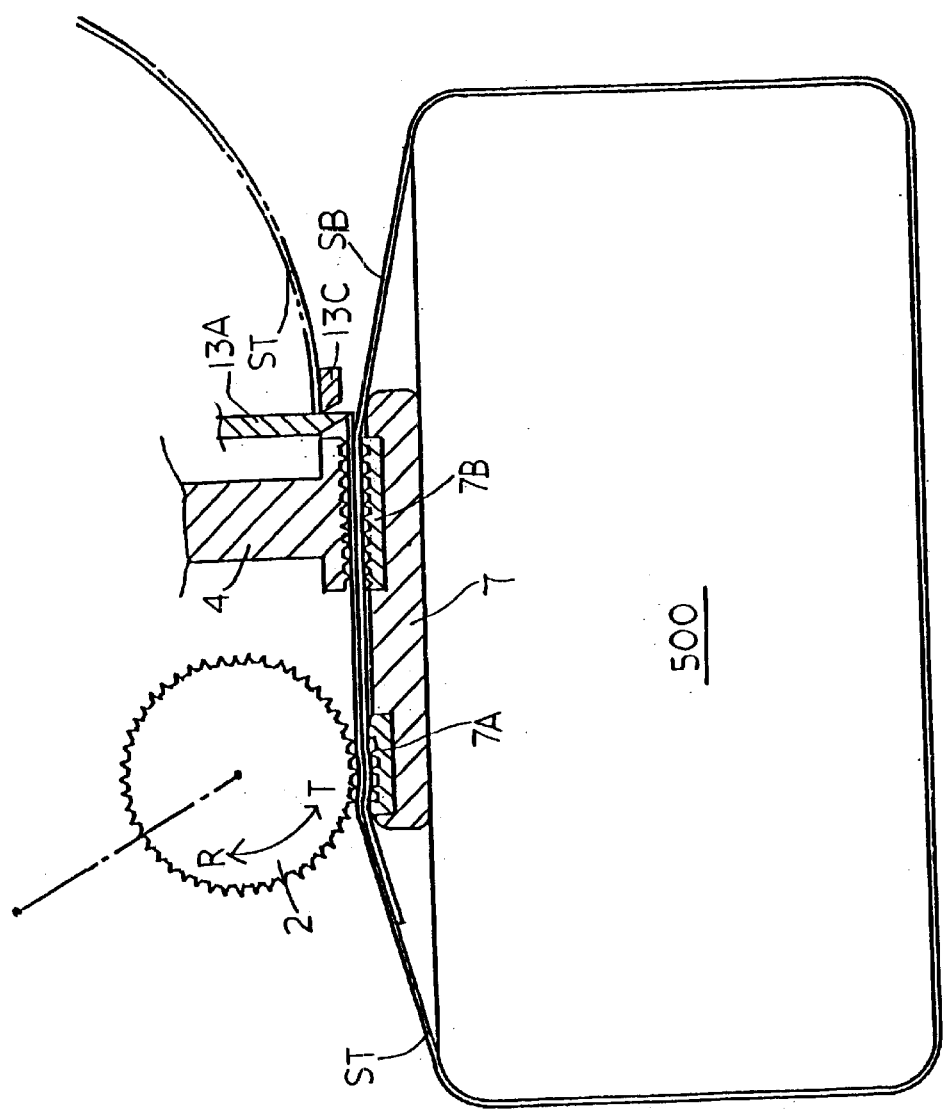
FIG. 5 is a view schematically illustrating a tight strap.
Figure 6:
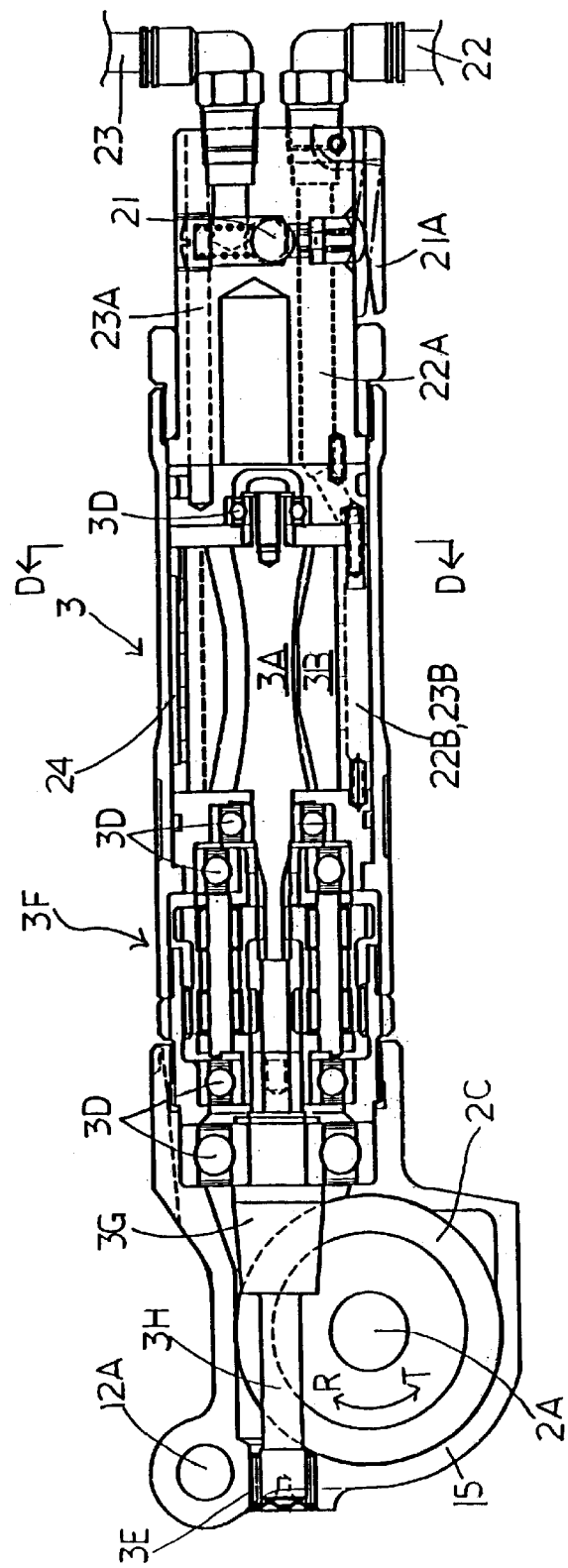
FIG. 6 is a sectional view illustrating a first pneumatic motor and a mechanism for driving a tightening rotor.
Figure 7:
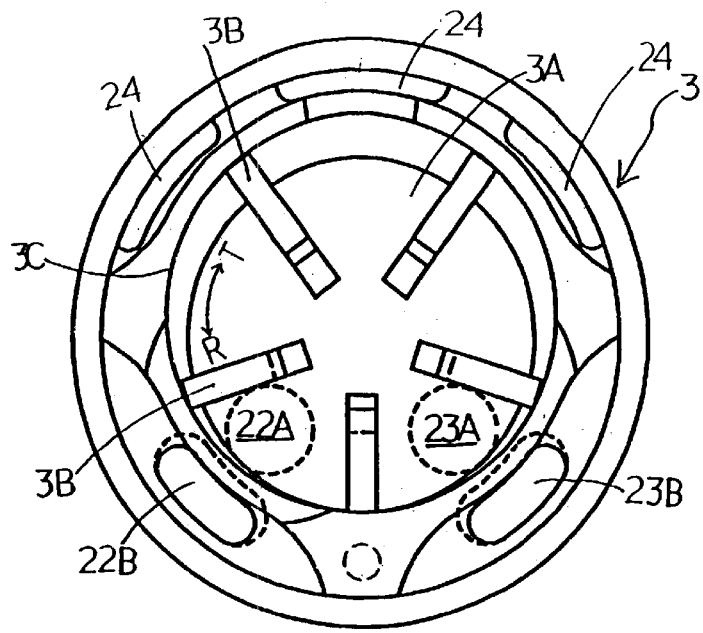
FIG. 7 is a sectional view along the line D—D in FIG. 6.
Figure 8:
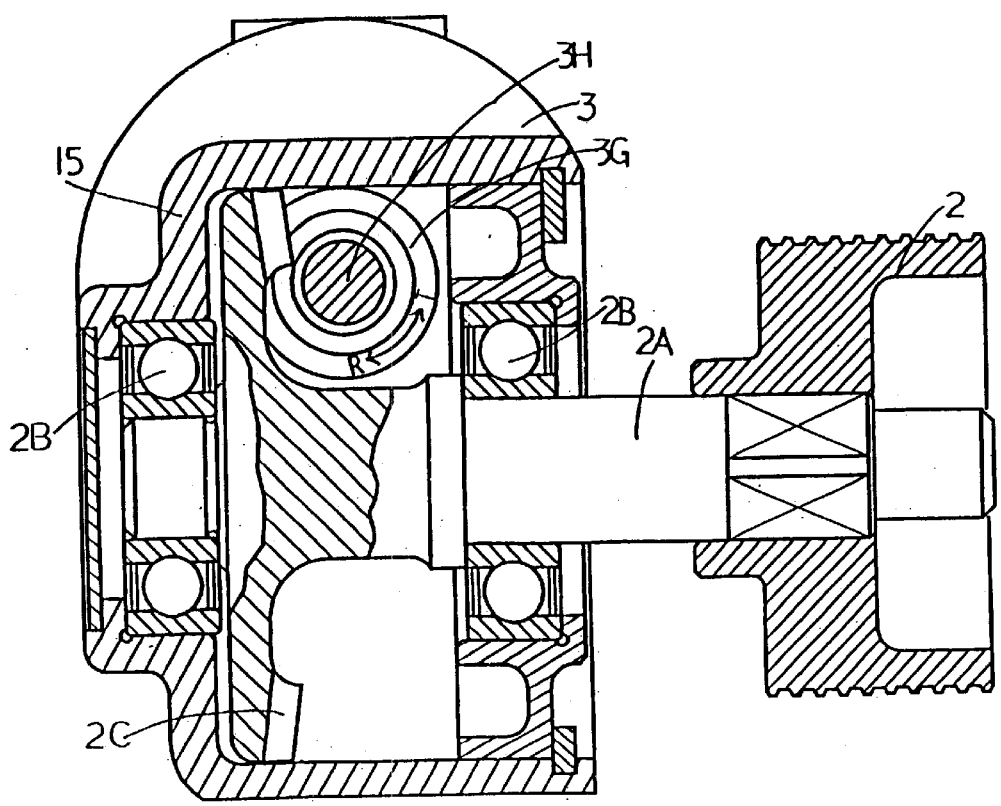
FIG. 8 is a sectional view along the line E—E in FIG. 3.
Figure 9:
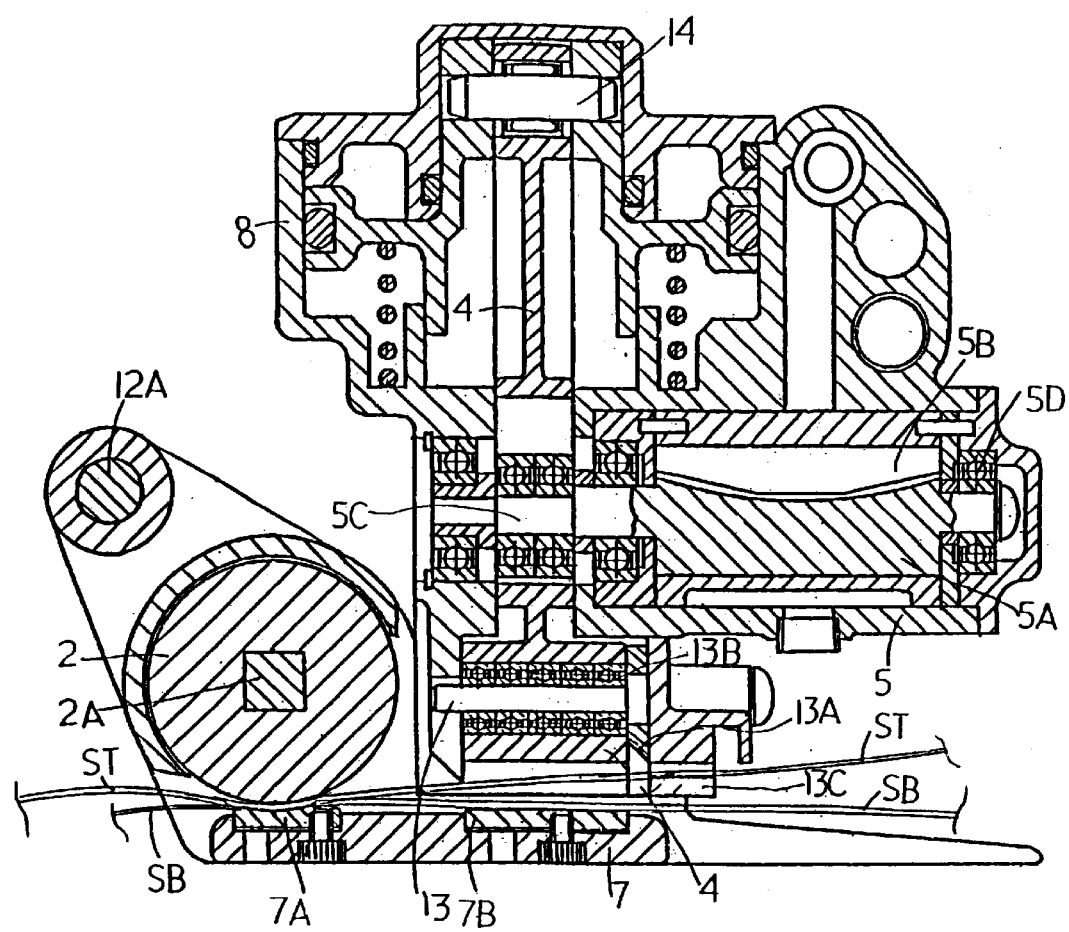
FIG. 9 is a sectional view along the line A—A in FIG. 2 of before being pressurized.
Figure 10:
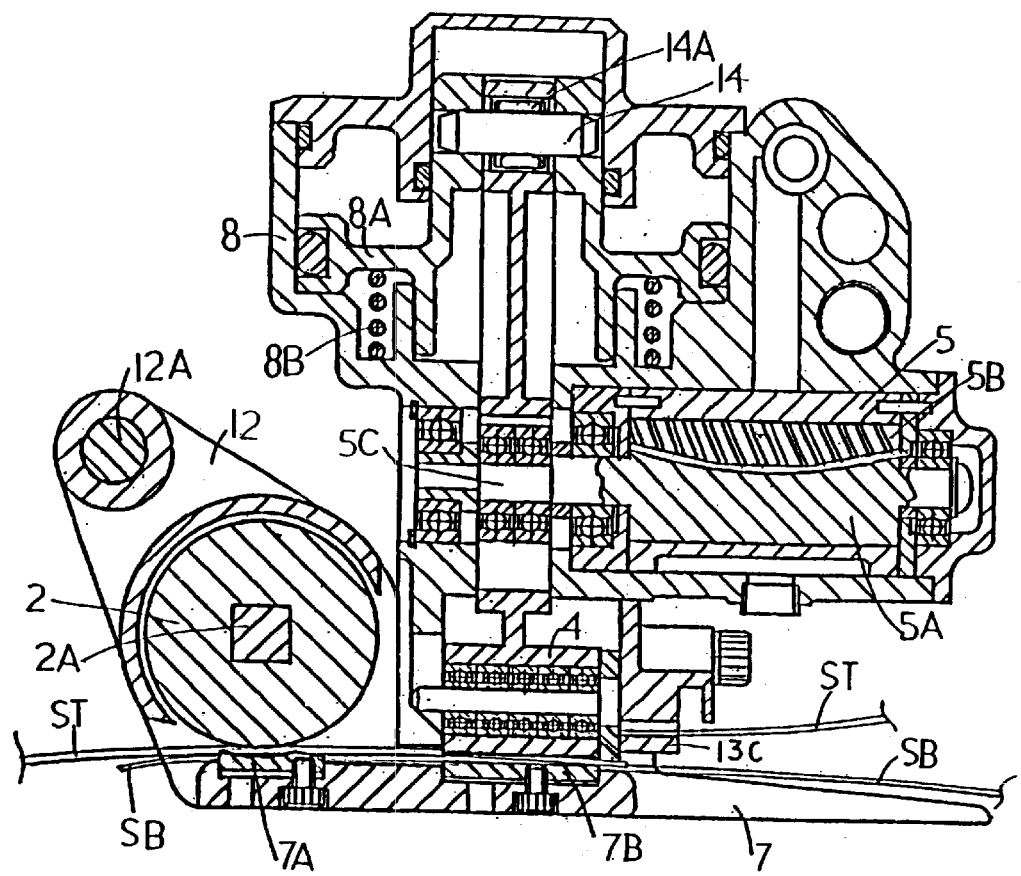
FIG. 10 is a sectional view along the line A—A in FIG. 2 of after being pressurized.
Figure 11:
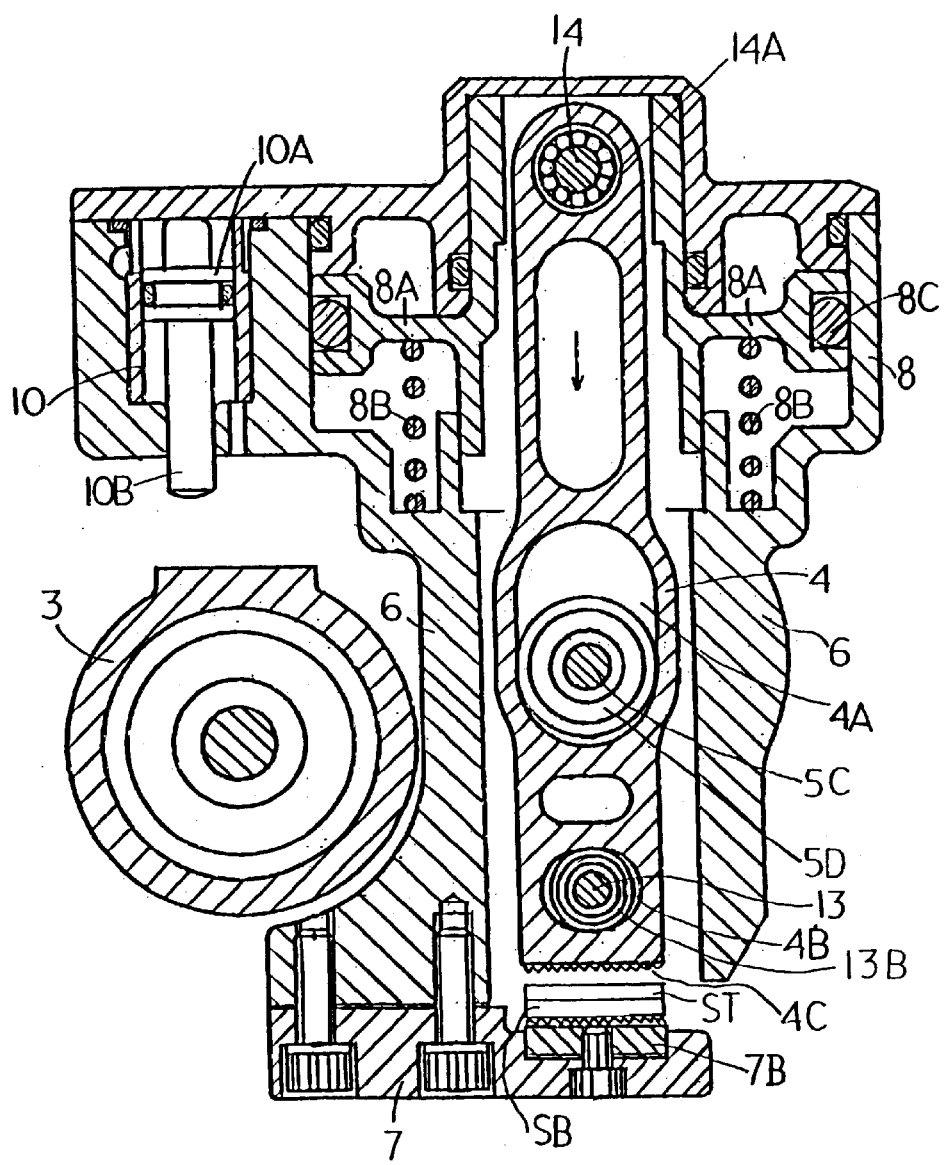
FIG. 11 is a sectional view along the line B—B in FIG. 2 of before being pressurized.
Figure 12:
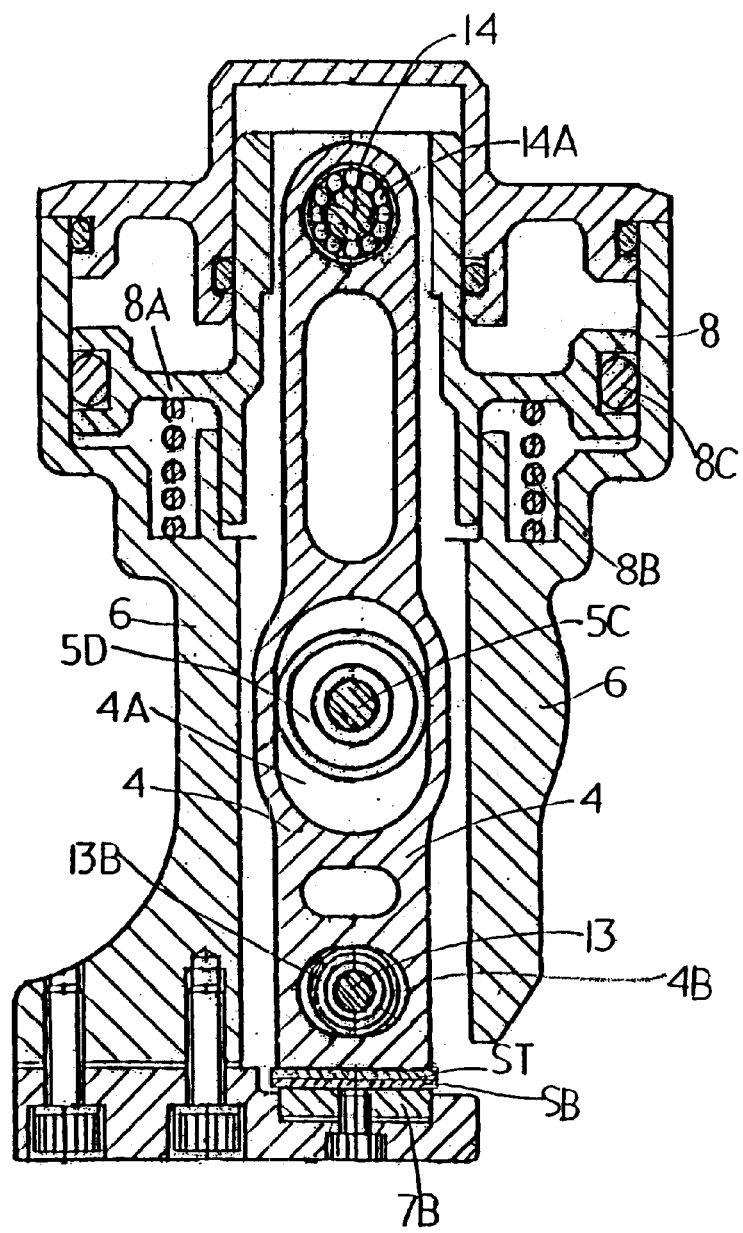
FIG. 12 is a sectional view along the line B—B in FIG. 2 of after being pressurized.
Figure 13:
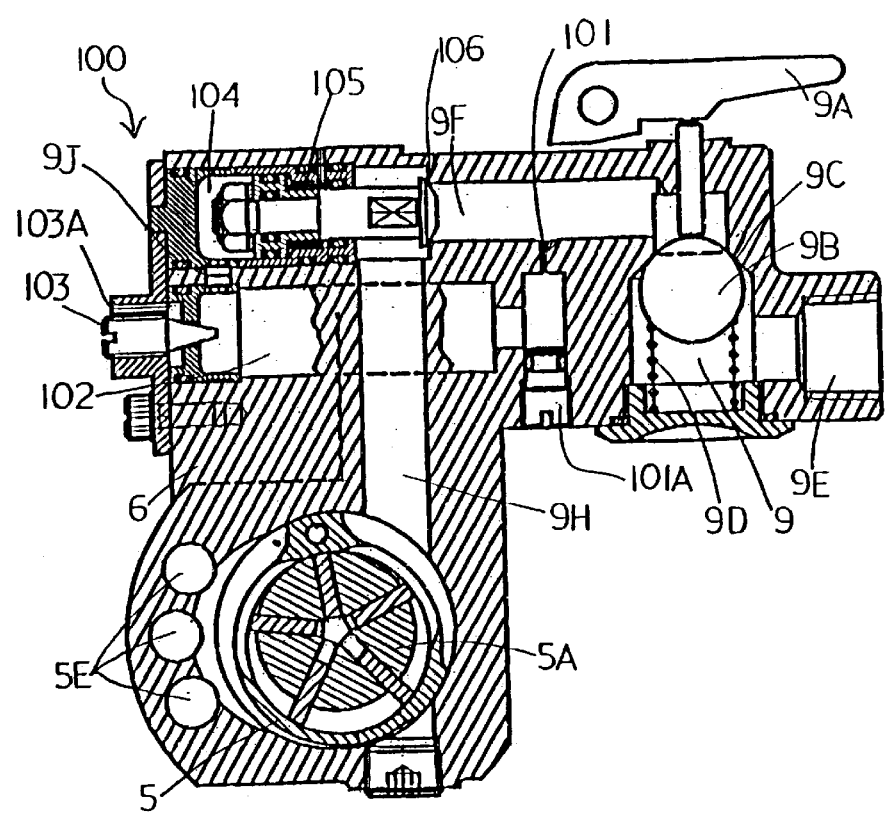
FIG. 13 is a sectional view along the line C—C in FIG. 2 (embodiment 1)
Figure 14:
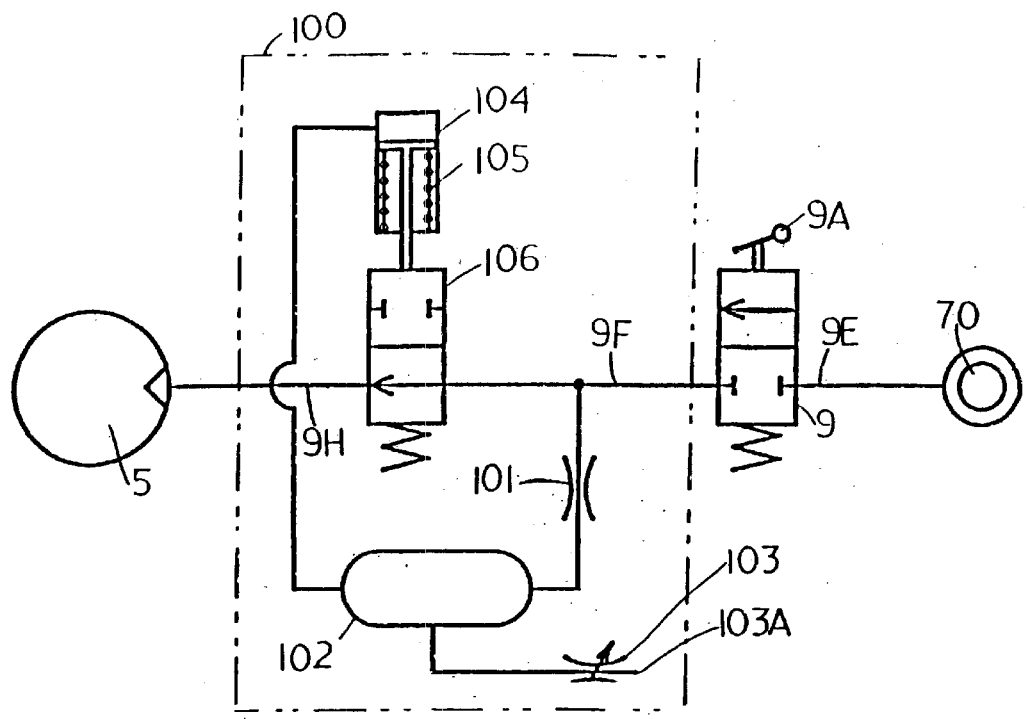
FIG. 14 is a circuit diagram of FIG. 13 (embodiment 1)
Figure 15:
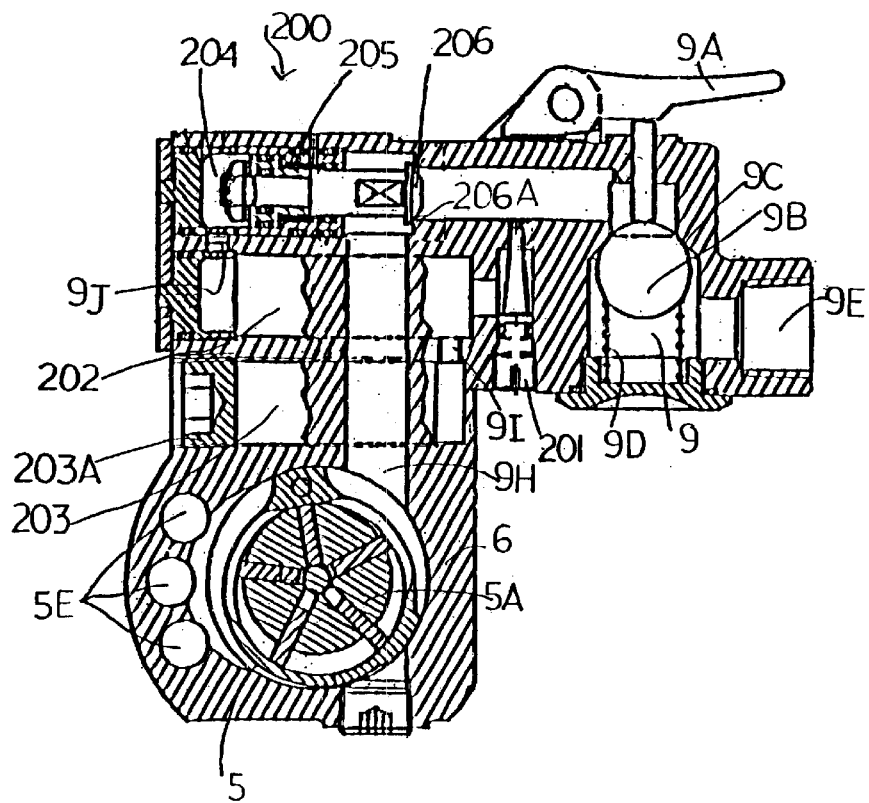
FIG. 15 is a sectional view along the line C—C in FIG. 2 (embodiment 2)
Figure 16:
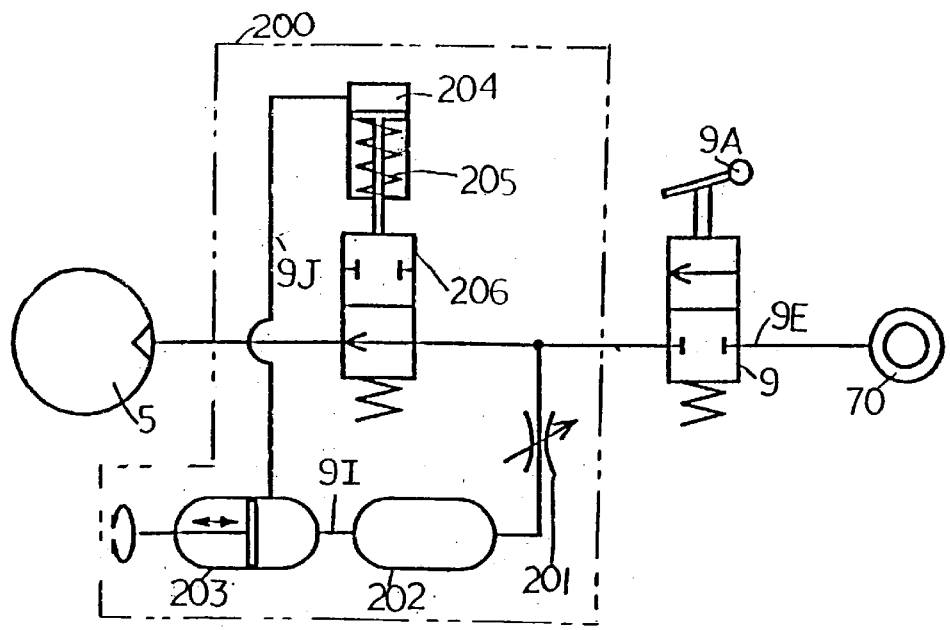
FIG. 16 is a circuit diagram of FIG. 2 (embodiment 2)
Figure 17:
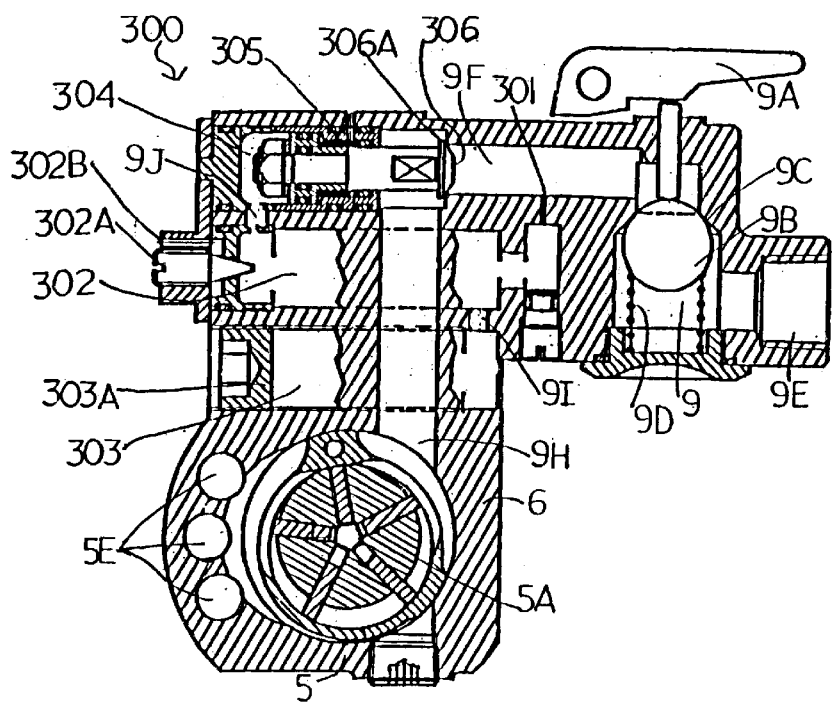
FIG. 17 is a sectional view along the line C—C in FIG. 2 (embodiment 3)
Figure 18:
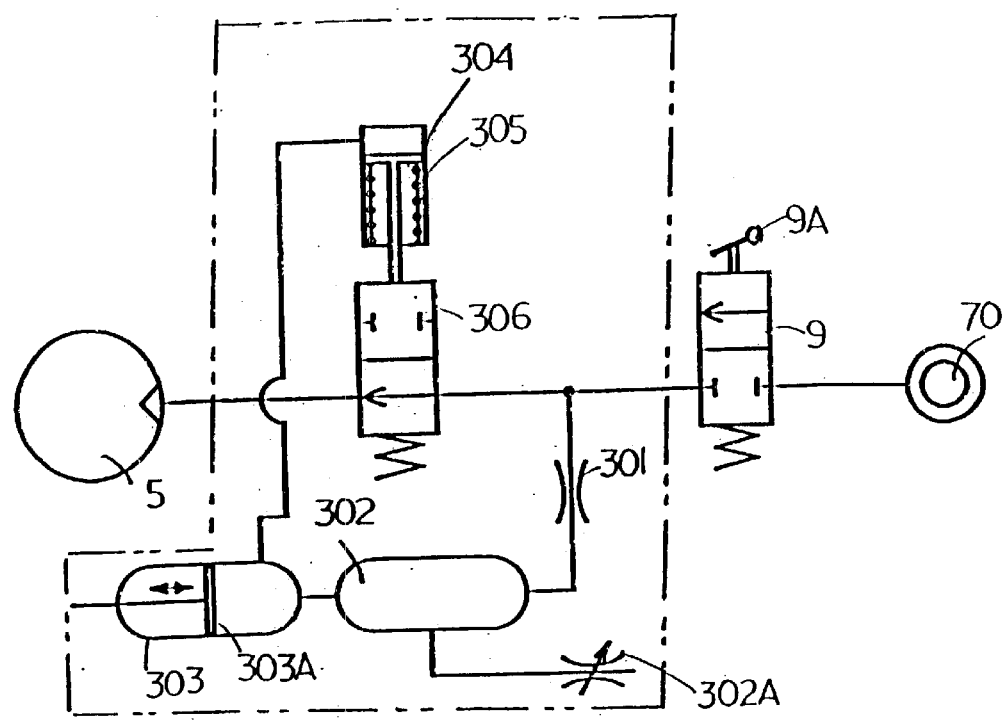
FIG. 18 is a circuit diagram of FIG. 17 (embodiment 3)
Figure 19:
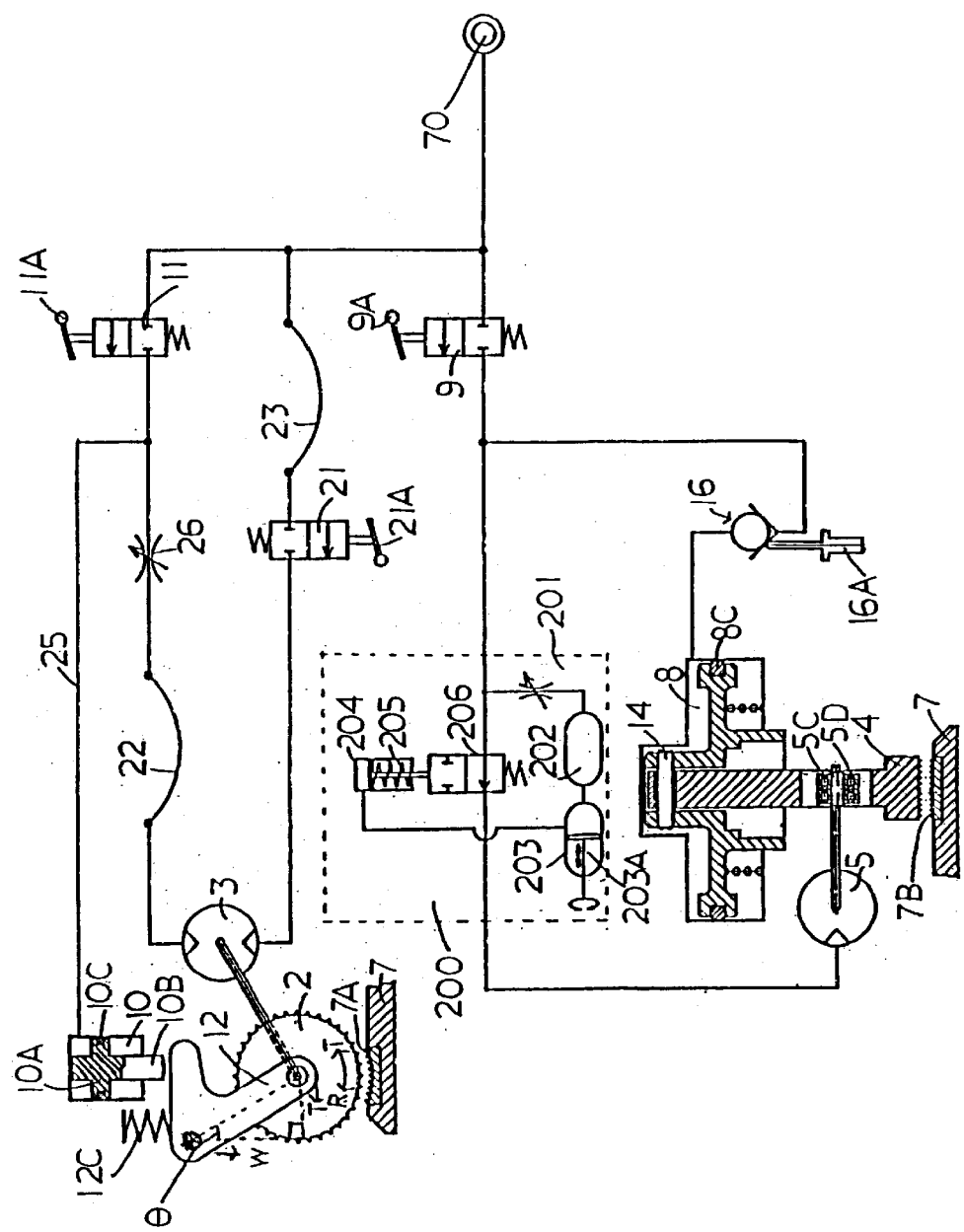
FIG. 19 is a diagram of a general basic circuit according to an embodiment of the present invention.

FIG. 1 is a view illustrating the right side of an embodiment, FIG. 2 is a plan view illustrating the embodiment, FIG. 3 is a view illustrating the left side of the embodiment, FIG. 4 is a front view illustrating the embodiment, FIG. 5 is a view schematically illustrating a tight strap, FIG. 6 is a sectional view illustrating a first pneumatic motor and a mechanism for driving a tightening rotor, FIG. 7 is a sectional view along the line D—D in FIG. 6, FIG. 8 is a sectional view along the line E—E in FIG. 3, FIG. 9 is a sectional view along the line A—A in FIG. 2 of before being pressurized, FIG. 10 is a sectional view along the line A—A in FIG. 2 of after being pressurized, FIG. 11 is a sectional view along the line B—B in FIG. 2 of before being pressurized, FIG. 12 is a sectional view along the line B—B in FIG. 2 of after being pressurized, FIG. 13 is a sectional view,along the line C—C in FIG. 2 (embodiment 1), FIG. 14 is a circuit diagram of FIG. 13 (embodiment 1), FIG. 15 is a sectional view along the line C—C in FIG. 2 (embodiment 2), FIG. 16 is a circuit diagram of FIG. 2 (embodiment 2), FIG. 17 is a sectional view along the line C—C in FIG. 2 (embodiment 3), FIG. 18 is a circuit diagram of FIG. 17 (embodiment 3), and FIG. 19 is a diagram of a general basic circuit according to an embodiment of the present invention.

In FIGS. 1 to 19, reference numeral 1 denotes an embodiment, 2 denotes a tightening roller, 2A denotes a tightening roller drive shaft, 2B denotes a ball bearing, 2C denotes a spiroid driven gear, 3 denotes a first pneumatic motor that rotates forward and reverse (for tightening or releasing the strap), 3A denotes a rotor, 3B denotes vanes, 3C denotes a perforated cylinder, 3D denotes a ball bearing, 3E denotes a needle roller bearing, 3F denotes a planetary reduction gear, 3G denotes a spiroid pinion gear, 3H denotes a pinion shaft, 4 denotes a vibrator, 4A denotes a vertically elongated hole, 4B denotes a horizontally elongated hole, 4C denotes a lower knurled surface of the vibrator, 5 denotes a second pneumatic motor (for driving the vibrator), 5A denotes a rotor, 5B denotes vanes, 5C denotes an eccentric output shaft of the second pneumatic motor, 5D denotes a ball bearing, 5E denotes an exhaust port, 6 denotes a casing, 7 denotes a base plate (bearing holder), 7A and 7B denote steps, 8 denotes a pneumatic cylinder for pressurizing the vibrator and the cutter, 8A denotes a piston, 8B denotes a return spring, 8C denotes an O-ring, 9 denotes a vibration valve, 9A denotes a vibration valve lever, 9B denotes a nylon ball, 9C denotes a valve seat, 9D denotes a coil spring, 9E denotes an air inlet port, 9F denotes an air feed pipe A, 9G denotes an air feed pipe B, 9H denotes an air feed pipe C, 9I denotes an air pipe among the pneumatic chambers, 9J denotes an air passage, 10 denotes a pneumatic cylinder for pressurizing the tightening roller, 10A denotes a piston, 10B denotes a piston rod, 10C denotes an O-ring, 11 denotes a valve for tightening, 11A denotes a valve lever for tightening, 12 denotes a hunger (swing arm), 12A denotes a hunger pin, 12C denotes a coil spring, 13 denotes a cutter pin, 13A denotes a cutter, 13B denotes a ball bearing, 13C denotes a stationary cutter, 14 denotes a pivot pin, 14A denotes a needle roller bearing, 15 denotes a gear box, 16 denotes a release valve, 16A denotes a release pin, 21 denotes a reversing valve, 21A denotes a reversing lever, 22 and 23 denote hoses, 22A and 22B denote air flow paths, 24 denotes an exhaust air path, 26 denotes a throttle valve, 30 denotes a grip, 70 denotes a source of pneumatic pressure, 100 denotes a timing mechanism (variable back pressure type), 101 denotes an orifice, 101A denotes an orifice screw, 102 denotes an air accumulation chamber, 103 denotes a needle valve, 103A denotes an exhaust port, 104 denotes a cylinder for driving a shut-off valve, 105 denotes a return spring, 106 denotes a shut-off valve, 106A denotes a shut-off valve seat, 200 denotes a timing device (variable volume type), 201 denotes a needle valve (for adjusting the orifice), 202 denotes an air accumulation chamber, 203 denotes an air accumulation chamber of the variable volume type, 203A denotes a screwed-in piston (for varying the volume), 204 denotes a cylinder for driving a shut-off valve, 205 denotes a return spring, 206 denotes a shut-off valve, 206A denotes a shut-off valve seat, 300 denotes a timing device (variable back pressure/volume type), 301 denotes an orifice, 302 denotes an air accumulation chamber, 302A denotes an exhaust needle valve (for varying back pressure), 302B denotes an exhaust port, 303 denotes an air accumulation chamber of the variable volume type, 303A denotes a screwed-in piston (for varying the volume), 304 denotes a cylinder for driving a shut-off valve, 305 denotes a return spring, 306 denotes a shut-off valve, 306A denotes a shut-off valve seat, and 500 denotes a package.

Referring, first, to FIGS. 1 to 4, the embodiment is roughly constituted by a strap tightening/releasing mechanism NO. 1 and a strap pressurizing/melt-adhering mechanism NO. 2 which are pivoted together by a hunger pin 12A in a laterally laid V-shape in cross section. The mechanism NO. 1 is constituted chiefly by a first pneumatic motor 3, reduction gears 3F and 15, and a tightening roller 2. The mechanism NO. 2 is constituted chiefly by a second pneumatic motor 5, a vibrator 4, a base plate 7, a pneumatic cylinder 8, a timing mechanism 100/200/300, a grip 30 and a plurality of valves linked together by a casing 6.

A coil spring 12C is fitted to a hunger pin 12A which is a horizontal shaft extending in a direction of the width to pivotally attach the mechanisms NO. 1 and NO. 2, whereby the two mechanisms are lightly urged toward a direction of increasing the angle with the hunger pin 12A as an axis. It is desired that a large urging force is produced by the coil spring toward the direction of decreasing the angle from the standpoint of initial tightening. When a strap is to be inserted, however, a large force of hand is required to increase the angle against the urging force, and making the assembling difficult, too. From the standpoint of operation, therefore, it is desired that a small urging force is produced. To compensate this, therefore, a pneumatic cylinder 10 for pressurizing the tightening roller is disposed (see FIG. 19) so as to work simultaneously based on a pneumatic pressure for the first pneumatic motor.

In a vertical wall intersecting at right angles with a working surface of the base plate 7 at an end, an elongated hole 12B of a partly arcuate shape (see FIG. 1) is perforated with a hunger pin 12A as a center to permit the motion of the drive shaft 2A of the tightening roller 2, thereby to permit the approach and separation between the tightening roller 2 and the base plate 7.

The overlapped portion of the strap is inserted between the base plate 7 and the tightening roller 2 by manually enlarging the angle of the two mechanisms NOs. 1 and 2 aided by the rotational moment produced by the weight of the mechanism NO. 1. When the worker releases his hand, the upper strap ST is pressed on its upper surface by the knurled tightening roller 2 and is brought into engagement. At the same time, the lower strap SB is pressed on its lower surface by the knurled step 7A and is brought into engagement (see FIG. 5). Here, the coefficient of friction between the strap ST and the strap SB is smaller than the coefficient of friction between the straps and the knurled surfaces of the tightening roller 2 and the step 7A. Therefore, the initial tightening is accomplished by the pressed engagement.

The tightening roller 2 and the hunger 12 pivotally supporting the tightening roller 2 are forming a wedge-like swing arm as shown in the left upper part in FIG. 19. When the hunger 12 is inclined by θ up to a vertical position, there is established the following relationship between the reactive torque T of the tightening roller 2 and the total pressing force W, i.e., $T/W = \tan\theta$, or $W = T/\tan\theta$.

Next, described below is the mechanism NO. 1.

The air is supplied from a source of pneumatic pressure 70 to an inlet port 71, and is guided to a tightening valve 11 and to a vibration valve. First, as the tightening valve lever 11A is depressed to start the operation, the air is fed to a first motor 3 through hose 22, and air paths 22A and 22B, so that a rotor 3A rotates in the direction of an arrow T (tightening direction, which is in the clockwise direction) as shown in FIG. 7. The rotational force is transmitted to a spiroid gear pinion 3G through a planetary reduction gear 3F, whereby a spiroid driven gear 2 in mesh therewith is driven in the direction T (counterclockwise direction) in FIG. 6, so that the tightening roller 2 pressing the upper strap ST is driven in the direction T (see FIG. 5) as described above. At the same time, the air from the tightening valve 11 through an air path is fed to a cylinder 10 for pressurizing the tightening roller to thereby compensate for the pressurizing force of the tightening roller 2 as described above. The amount of the air supplied to the first pneumatic motor 3 is adjusted through the throttle valve 26 to thereby increase or decrease the tightening force. The first pneumatic motor 3 rotates in the direction T to impart a required tightening force to the strap ST and, then, comes into a stall. This state is maintained until the completion of the melt-adhering operation by friction that will be described below.

The mechanism NO. 2 will now be described.

The mechanism for cutting the strap and for melt-adhering the strap by friction has been known already. An embodiment of the present invention will now be described with reference to FIGS. 9 to 12.

According to the present invention, a feature resides in that a vibrator element 4 is linked, via a pivot pin 14, to a vibrator and to a pneumatic cylinder 8 for pressurizing the cutter, and unnecessary part of the strap ST is cut and the straps ST, SB are frictionally melt-adhered together under optimum pressure and friction time conditions by using the power (compressed air) instead of moving a hand lever by hand that was done so far.

First, the casing 6 is fastened to the base plate 7 at the lower end by using a plurality of bolts. The pneumatic cylinder 8 is arranged at an upper end of the casing 6, and a timing mechanism is arranged adjacent thereto. A vibration mechanism such as vibrator is arranged at a lower part of the pneumatic cylinder 8, and a second pneumatic motor 5 for vibration is arranged at a lower part of the timing mechanism.

When the lever 11A is depressed, the tightening roller 2 still remains at rest. Then, as the lever 9A is maintained depressed, the air drives the pressurizing cylinder 8 and the second pneumatic motor 5 for vibrator, and further flows into the air accumulation chambers in the timing mechanism 100/200/300 and is accumulated therein. FIGS. 9 and 11 illustrate a state of before the valve 9 is being opened and where the piston 8 and the vibrator 4 are at a top dead center being urged by a return spring 8B.

Next, FIGS. 10 and 12 illustrate a state where the valve 9 is opened, the air flows into the pneumatic cylinder 8 to pressurize the piston 8 from the upper side and to push the piston 8 down overcoming the resilient force of the return spring 8B. The vibrator 4 descends as the piston 8 descends, whereby a cutter 13A engaged with a cutter pin 13 descends, the cutter pin 13 being inserted in the horizontal elongated hole 4B of the vibrator 4. The blade of the cutter 13A comes in contact with the strap ST that has been placed on a stationary cutter 13C thereby to cut the strap ST. Furthermore, a lower knurled surface 4C of the vibrator 4 pushes down the left side portion of the strap ST that is cut, so that it is overlapped and pressed onto the strap SB that has been placed on the step 7B.

An extra strap ST (right side in FIG. 10) that is cut remains on the stationary cutter 13C and can be easily removed. The second pneumatic motor 5 starts rotating just in advance of this position, and the vibrator 4 vibrates right and left due to an eccentric shaft 5C of the second pneumatic motor fitted into the vertically elongated hole 4A of the vibrator 4 and the ball bearing 5F. Accordingly, the strap ST vibrates at a high speed in the direction of width of the strap on the strap SB fastened by the step 7B, and the frictional motion in the right-and-left direction as viewed in FIG. 12 is continued between the straps ST and SB for a period of time determined by the timing mechanism 100/200/300.

The timing mechanism will now be described in detail.

FIGS. 13 and 14 are a sectional view illustrating a major portion of the timing mechanism 100 according to an embodiment 1 (variable back pressure type) and a circuit diagram thereof.

In the embodiment shown in FIG. 13, when a nylon ball 9C is depressed accompanying a depression of the lever 9A, a gap is formed relative to a valve seat 9B, whereby the air pressure in the air inlet port 9E passes through the air feed pipe 9F to push a shut-off valve 106. Usually, the shut-off valve 106 is urged leftward by a weak return spring 105 so as to remain opened. Therefore, the air passes through an air feed pipe 9H to drive the second pneumatic motor 5, and escapes into exhaust ports 5E. Part of the air being fed flows through an orifice 101 and accumulates in an air accumulation chamber 102. When a predetermined pressure is reached, the air passes through an air path 9J and flows into the opposite side of the shut-off valve 106 to close the shut-off valve. The shut-off valve 106 remains closed due to the air pressure continuously fed through the orifice 101, until the operation of the next time begins. During this period, the back pressure in the air accumulation chamber 102 is adjusted by releasing part of the back pressure through an exhaust port 103A being adjusted by a needle valve 103, in order to finely adjust the time for driving the second pneumatic motor 5. That is, the timing mechanism 100 works as a mechanism for adjusting the friction/melt-adhesion time for the straps ST, SB.

FIG. 15 is a sectional view illustrating a major portion of an embodiment 2 (variable volume type) and FIG. 16 is a circuit diagram thereof. In this case, a needle valve 201 forms the fixed orifice like in the embodiment 1. The lever 9A is depressed to open the circuit, the air is fed into the second pneumatic motor 5 and is accumulated in the air accumulation chambers 202 and 203 arranged in parallel while the melt-adhesion by friction is being effected for the straps ST, SB. Here, the left end of one air accumulation chamber 203 is formed of a screwed-in piston (threaded closure) so that the volume can be varied.

Therefore, this embodiment makes it possible to adjust the amount of the air that flows in and/or the amount of the air that accumulates by turning the needle valve 201 and/or the screwed-in piston from the external side. Here, the screwed-in piston may be constituted by a screw and a piston fitted to the screw and spline-fitted to the inner wall of the cylinder.

Described below is an embodiment 3 (variable back pressure/volume type).

FIG. 17 is a sectional view illustrating a major portion of the embodiment, and FIG. 18 is a circuit diagram thereof. In this embodiment shown in FIGS. 17 and 18, an air accumulation chamber 302 of the variable back pressure type and an air accumulation chamber 303 of the variable volume type are arranged in parallel, and are coupled together in series through an air pipe 9I. This makes it possible to adjust the time for driving the second pneumatic motor 5 over a wider range. Upon employing a needle valve as the fixed orifice 301 as in the embodiment 2, furthermore, the range of adjustment can be more increased.

FIG. 19 is a diagram of a general basic circuit according to an embodiment of the present invention.

After the second pneumatic motor 5 has automatically come into a halt and after a period of time (1 to 3 seconds) has passed so that the straps melted due to the heat of friction are completely adhered together, the worker lightly grips the right end of the first pneumatic motor 3 and depresses the lever 21A of the reversing valve 21 by his small finger (FIG. 1). Then, the air is fed from an elongated air feed hole 23B for reverse turn in the perforated cylinder 3C of the first pneumatic motor 3 shown in FIG. 7, and the rotor 3A of the first pneumatic motor 3 rotates reverse (direction R). At the same time, no air is fed into the air feed pipe 24, and no pressure is exerted on the piston 10A in the pneumatic cylinder 10 for pressurizing the tightening roller.

As a result, a hunger 15 turns counterclockwise in FIG. 10, a hunger 12 inclines and returns causing the tightening roller 2 to be separated away from the base plate 7. As the hunger 12 rises, a release pin 16A is pushed up so that a release valve 16 is opened. Therefore, the vibrator 4 rises being urged by the return spring 8B, and the straps ST, SB are liberated. Therefore, the strap that is melt-adhered can be easily taken out. Thus, a series of operations ends.

The above-mentioned objects are all accomplished by the embodiment of the present invention.

That is, there is provided a tool for fastening and melt-adhering a strap, which makes it possible to adjust the time for frictionally melt-adhering the strap over a wide range and highly precisely compared with the prior art, the tool being so light in weight that it can be operated by one hand to carry out the operation highly efficiently and for extended periods of time.

What is claimed is:

1. A tool for tightening and melt-adhering a strap, with which a loose strap wound round a package is tightened by a tightening roller arranged at the overlapped portion of the strap to form a tight strap, an extra strap is cut and removed by a cutter, and a frictional force is imparted to the overlapped portion of the strap to melt-adhere the strap, wherein provision is made of a fluid pressure cylinder for pressurizing the tightening roller, a first fluid pressure motor for turning said roller forward and reverse, a fluid pressure cylinder for pressurizing a vibrator that gives a frictional force to the overlapped portion of the strap, and a second fluid pressure motor for driving said vibrator, a fluid pressure timing mechanism, wherein the fluid pressure timing mechanism is a variable back pressure type in which at least one of the fluid accumulation chambers branched from a main pressurized fluid circuit has a variable back pressure valve for releasing the fluid back pressure, said fluid pressure timing mechanism being further equipped with a shut-off valve which shuts off the main pressurized fluid circuit to the second fluid pressure motor relying upon a fluid pressure stored in the fluid accumulation chamber.

2. A tool for tightening and melt-adhering a strap, with which a loose strap wound round a package is tightened by a tightening roller arranged at the overlapped portion of the strap to form a tight strap, an extra strap is cut and removed by a cutter, and a frictional force is imparted to the overlapped portion of the strap to melt-adhere the strap, wherein provision is made of a fluid pressure cylinder for pressurizing the tightening roller, a first fluid pressure motor for turning said roller forward and reverse, a fluid pressure cylinder for pressurizing a vibrator that gives a frictional force to the overlapped portion of the strap, and a second fluid pressure motor for driving said vibrator, a fluid pressure timing mechanism, wherein the fluid pressure timing mechanism is a variable volume type in which at least one of the fluid accumulation chambers branched from a main pressurized fluid circuit is of the variable volume type being constituted by a piston that can be moved by a screw directly driven from the external side and a cylindrical fluid accumulation chamber, said fluid pressure timing mechanism being further equipped with a shut-off valve which shuts off the main pressurized fluid circuit to the second fluid pressure motor relying upon a fluid pressure stored in the fluid accumulation chamber.

3. A tool for tightening and melt-adhering a strap according to claim 1 or 2, wherein provision is made of the timing mechanism capable of adjusting the time for feeding a pressurized fluid to the second fluid pressure motor.

4. A tool for tightening and melt-adhering a strap according to claim 3, wherein the timing mechanism works based on a fluid pressure.

5. A tool for tightening and melt-adhering a strap around a package, comprising:

a housing;

a tightening roller disposed in the housing, the tightening roller having a roller for tightening the strap by turning forward and reverse;

a first fluid pressure cylinder coupled to the tightening roller for pressurizing the tightening roller;

a first fluid pressure motor coupled to the tightening roller for turning the tightening roller forward and reverse;

a cutter disposed in the housing for cutting the strap;

a vibrator disposed in the housing, the vibrator being configured to impart a frictional force to the strap to melt-adhere the strap;

a second fluid pressure cylinder coupled to the vibrator for pressurizing the vibrator against the strap;

a second fluid pressure motor coupled to the motor for driving the vibrator to impart the frictional force to melt-adhere the strap; and a timing mechanism disposed in the housing, for controlling time for the second fluid pressure motor to drive the vibrator, wherein the timing mechanism is a variable back pressure type that includes a main pressurized fluid circuit coupled to the second fluid pressure motor, at least one fluid accumulation chamber branched from the main pressurized fluid circuit, a variable back pressure valve for releasing a fluid back pressure, and a shut-off valve for shutting off the main pressurized fluid circuit.

6. A tool for tightening and melt-adhering a strap around a package, comprising:

a housing;

a tightening roller disposed in the housing, the tightening roller having a roller for tightening the strap by turning forward and reverse;

a first fluid pressure cylinder coupled to the tightening roller for pressurizing the tightening roller;

a first fluid pressure motor coupled to the tightening roller for turning the tightening roller forward and reverse;

a cutter disposed in the housing for cutting the strap;

a vibrator disposed in the housing, the vibrator being configured to impart a frictional force to the strap to melt-adhere the strap;

a second fluid pressure cylinder coupled to the vibrator for pressurizing the vibrator against the strap;

a second fluid pressure motor coupled to the motor for driving the vibrator to impart the frictional force to melt-adhere the strap; and a timing mechanism disposed in the housing, for controlling time for the second fluid pressure motor to drive the vibrator, wherein the timing mechanism is a variable volume type that includes a main pressurized fluid circuit coupled to the second fluid pressure motor, at least one fluid accumulation chamber branched from the main pressurized fluid circuit, the chamber having a piston that can be moved to vary a volume of the chamber, and a shut-off valve for shutting off the main pressurized fluid circuit.

7. The tool of claim 5 or 6, wherein the timing mechanism is disposed in the housing and controls time for the second fluid pressure motor to drive the vibrator.

* * * * *